United States Patent [19]
Eilersen

[11] 3,880,008
[45] Apr. 29, 1975

[54] ARRANGEMENT FOR OCCASIONALLY DETERMINING THE PRESSURE IN A HYDRAULIC OR PNEUMATIC SYSTEM

[76] Inventor: Nils Aage Juul Eilersen, 226-232 Gongehusvej, DK-2950 Vedbaek, Denmark

[22] Filed: Apr. 2, 1973

[21] Appl. No.: 346,803

[52] U.S. Cl. ............... 73/398 C; 73/119 A; 73/389; 137/557; 317/246
[51] Int. Cl. ............................................. G01l 9/12
[58] Field of Search ........... 73/398 C, 119 A, 146.5; 137/557, 539; 317/246, 256

[56] References Cited
UNITED STATES PATENTS

| | | | |
|---|---|---|---|
| 1,939,067 | 12/1933 | Legg | 73/398 C |
| 2,571,507 | 10/1951 | Welch | 73/398 C |
| 2,725,501 | 11/1955 | Sihvonen | 73/398 C |
| 3,122,919 | 3/1964 | Kendrick | 73/398 C |

*Primary Examiner*—Donald O. Woodiel
*Attorney, Agent, or Firm*—Watson, Cole, Grindle & Watson

[57] ABSTRACT

For the purpose of occasionally determining the pressure in a hydraulic or pneumatic system, an element of the system is replaced by a similar element which has the same function in the normal operation of the system and has a wall which surrounds a cavity to which the hydraulic or pneumatic fluid in the system has access and is again permanently surrounded by a capacitor electrode, said capacitor electrode forming together with said wall a hydraulic or pneumatic pressure sensing capacitor, which may be connected to a calibrated capacity measuring device whenever it is desired to determine the hydraulic or pneumatic pressure within the system.

6 Claims, 3 Drawing Figures

ARRANGEMENT FOR OCCASIONALLY DETERMINING THE PRESSURE IN A HYDRAULIC OR PNEUMATIC SYSTEM

BACKGROUND OF THE INVENTION

This invention relates to a method of occasionally determining the pressure in a hydraulic or pneumatic system.

It is known to perform such a measurement by disconnecting a pipe or the like from the hydraulic system at some screw connection and instead to mount a pressure gauge, which may consist of a tubular element surrounded by a capacitor electrode, the tubular element and the electrode forming a capacitor, the value of which depends on the degree of expansion of the element resulting from the pressure prevailing in the hydraulic system, the pressure gauge further comprising electronic means for producing a signal representative of the capacity value of said capacitor, which signal may be supplied to an electric measuring instrument calibrated in terms of pressure.

This procedure has the disadvantage that when the hydraulic system is opened as described impurities may penetrate into the system, and that the system must be put out of operation as long as the measurement takes place. The whole procedure is rather time consuming. Sometimes a pressure gauge of the type described is therefore permanently mounted in the system. However, the price of such a pressure gauge is prohibitive for many uses where inspection is only required from time to time.

SUMMARY OF THE INVENTION

According to the invention, an element of the system is permanently replaced by a similar element which has the same function in the normal operation of the system and has a wall which surrounds a cavity to which the hydraulic or pneumatic fluid in the system has access and is again permanently surrounded by a capacitor electrode, said capacitor electrode forming together with said wall a hydraulic or pneumatic pressure sensing capacitor, and said sensing capacitor is connected to a calibrated capacity measuring device whenever it is desired to determine the hydraulic or pneumatic pressure within the system. Thus, by a slight and inexpensive modification of an element of the system the advantage has been obtained, as compared with the normal pressure determining procedure for such systems, that the determination takes place without any dismounting and mounting operations and without having to put the system out of operation, and with the aid of a measuring device that does not form part of the system and therefore does not add to its price.

In terms of structure, the invention comprises an arrangement for occasionally determining the pressure in a hydraulic or pneumatic system, in which an element having a function in the normal operation of the system has a wall which surrounds a cavity to which the hydraulic or pneumatic fluid within the system has access and is again permanently surrounded by a capacitor electrode, and is constructed for easy connection of electric wires to the capacitor electrode and to the element itself, said capacitor electrode forming together with said element a hydraulic pressure sensing capacitor.

In a preferred embodiment of the invention, the capacitor electrode is again surrounded by a protecting sleeve. This may be of metal and in metallic contact with the element in which case it wil increase the capacity value of the capacitor assembly without however contributing to the variations of this value occuring in reponse to pressure variations in the hydraulic system. The sleeve may have a hole through which a contact pin may be inserted to engage the capacitor electrode, suitable insulating means being provided for preventing contact between the contact pin and the sleeve.

The capacity value of the capacitor assembly may be adjusted by filling a greater or smaller quantity of a dielectric material into the space between the element and the capacitor electrode and/or between the capacitor electrode and the protecting sleeve. In this manner it becomes possible to use a fixedly calibrated electronic circuit and reading or recording instrument for measuring the hydraulic pressure at a plurality of locations with great accuracy.

The element to be replaced may e.g. be a conventional screw fitting or a valve housing, an important example being an outlet valve of a fuel injection pump. In that case the cavity of the element forms part of the normal flow path of the hydraulic or pneumatic fluid. Another example is a closing plug or cover for any kind of service opening of a hydraulic or pneumatic system.

DESCRIPTION OF THE PREFERRED EMBODIMENTS

Figure 1:
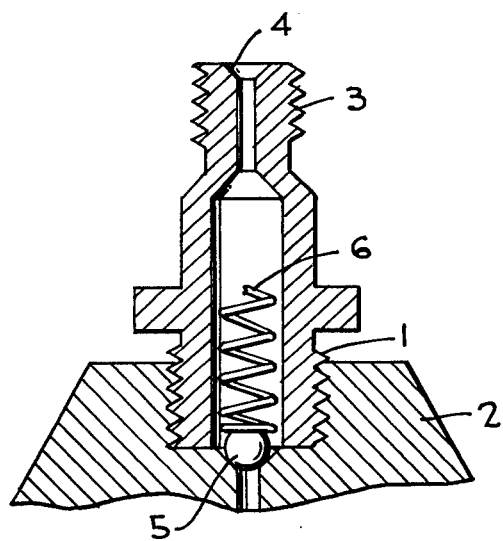
FIG. 1 shows a longitudinal section through a tubular fitting or valve mounted in position on a hydraulic apparatus, such as the housing of a fuel injection pump.

A conventional screw fitting can be constructed as shown in FIG. 1 with a thread 1 for mounting the fitting on a machine part, such as the housing 2 of a fuel pump. A pipe can be connected to the fitting or valve housing by means of a cap engaging a thread 3 at the top of the fitting so as to engage a flange of the pipe with a conical seat 4 of the fitting. 5 is a ball which together with a spring symbolized by an arrow 6 forms a non-return valve which is necessary for the function of the fuel pump.

Figure 2:
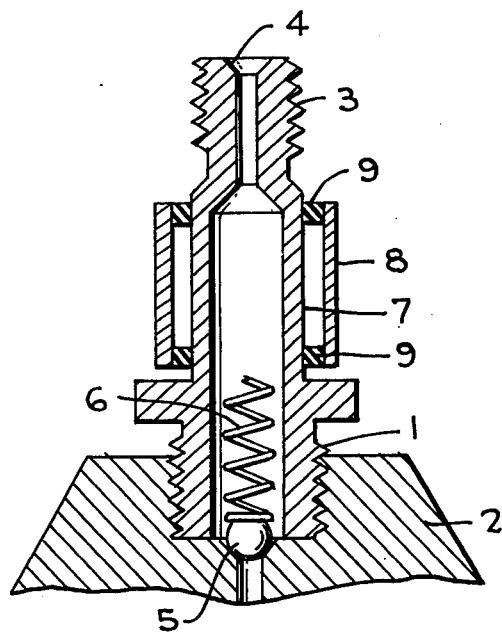
FIG. 2 shows the same element as modified according to the invention in one embodiment thereof.

In the embodiment of the invention illustrated in FIG. 2, a conventional screw fitting or valve housing of the type illustrated in FIG. 1 and forming a permanent and necessary part of a hydraulic system is so constructed as to operate both as a necessary flow passage element of the hydraulic system and as a measuring capacitor of a pressure gauge. To this end the fitting or the like is constructed with an outer cylindrical surface 7 around which there is provided a tube 8 which is insulated from the fitting or the like by means of insulating rings 9 so as to form a capacitor electrode which together with the cylindrical surface 7 forms a tubular capacitor which can be used as a pressure sensing capacitor as above described. If the pressure in the hydraulic system varies, the diameter of the cylindrical surface will vary whereby again the distance between the cylindrical surface and the electrode 8 and thereby the capacity value of the capacitor will vary.

When the hydraulic system is to be inspected, this variation of the capacity value can easily be measured by connecting a portable capacity measuring circuit to the cylindrical surface 7 and to the capacitor electrode 8 by means of a contact clip. In this manner the fitting or the like serves both as a necessary flow passage element and as a measuring capacitor of a pressure gauge.

Figure 3:
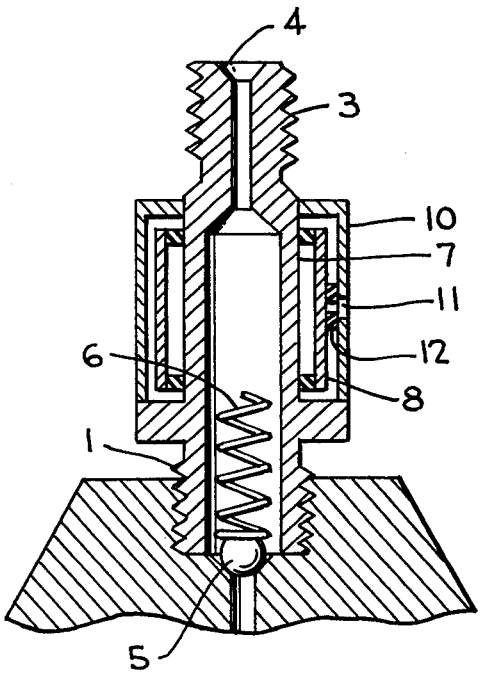
FIG. 3 shows a similar section through a valve housing constructed in accordance with another embodiment of the invention.

A particularly advantageous embodiment is illustrated in FIG. 3. In this FIG. 1o is a protecting sleeve which is slid onto the cylindrical surface and is constructed at one end with a collar firmly engaging that surface, the other end of the sleeve engaging a shoulder or recess of the element. The protecting sleeve serves both to protect the insulating rings 9 and the tube 8 against mechanical injury and, even more importantly, to reinforce the cylindrical surface against torsional and bending oscillations between the pump and the pipe. The protecting sleeve has a high reinforcing effect against such oscillations because the moment of inertia increases with the fourth power of the radius. Such oscillations might otherwise give rise to measuring errors.

The protecting sleeve 1o has a hole 11 through which a contact pin can be inserted to engage the capacitor electrode 8. The hole 11 is sealed by means of an O-ring 12 which is held in position by the edge of the hole and is so dimensioned that it is firmly clamped between the tubes 8 and 1o, whereby a good sealing is obtained in an inexpensive manner. The electric connections to the measuring capacitor may be established by means of a clip or jaw which is adapted to be clamped around the protecting sleeve and is provided with a contact pin which is insulated from the rest of the device and is adapted to penetrate through the hole 11 into engagement with the element 8.

The capacitor $C_1$ which is formed by the cylindrical surface 7 and the inner wall of the element 8 is subjected to a change $\Delta C_1$ when the cylindrical surface changes its diameter in response to a pressure change $\Delta P$. The sensitivity $\Delta C/\Delta P$ is determined by the geometrical dimensions, the material constants and the dielectricity constant $\epsilon$ in the space between 7 and 8. The dimensions and the material constant are predetermined within certain tolerance limits, but the effective value of $\epsilon$ can easily be changed by filling the space between 7 and 8 more or less with e.g. teflon foil or powder. Hereby the effect of manufacturing tolerances can easily be eliminated so that all units would have the same sensitivity. Since the electronic circuit measures $\Delta C_1/C$, where C is the sum of all component capacities, the sensitivity can also be adjusted by adjusting C. The simplest way of doing this is to change the capacity $C_2$ between the protecting sleeve and the outer side of the element 8 by filling the space between 8 and 1o more or less with teflon foil or powder.

What is claimed is:

1. A non-return valve for a fuel injection pump comprising an elongated substantially cylindrical valve housing having a longitudinal flow passage surrounded by a cylindrical wall of a length and wall-thickness suitable for making it operable as a pressure sensitive electrode of a pressure sensing capacitor when subjected to the pressure of fuel flowing through said flow passage, and a tubular element surrounding said wall and insulated therefrom to form a counter electrode of said pressure sensing capacitor.

2. A valve as in claim 1, wherein said tubular element is surrounded by a protecting sleeve.

3. A valve as in claim 2, wherein said protecting sleeve is of metal and is in metallic contact with said valve housing.

4. A valve as in claim 3, wherein said protecting sleeve is provided at its outer end with a collar firmly engaging said valve housing.

5. A valve as in claim 2, wherein said sleeve has a hole through which a contact pin may be inserted to engage said tubular element, insulating means being provided for preventing contact between the contact pin and the sleeve.

6. A valve as in claim 4, wherein said insulating means comprise an O-ring, which is clamped between said tubular element and the edge of said hole.

* * * * *